Jan. 10, 1950  J. SCHATZ  2,494,362
EDUCATIONAL BLACKBOARD
Filed July 2, 1946  2 Sheets-Sheet 1

INVENTOR.
JOSEPH SCHATZ
BY
ATTORNEY

Jan. 10, 1950 J. SCHATZ 2,494,362
EDUCATIONAL BLACKBOARD
Filed July 2, 1946 2 Sheets-Sheet 2
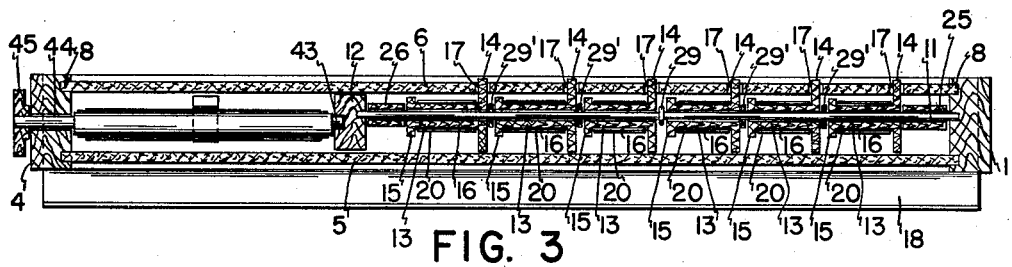
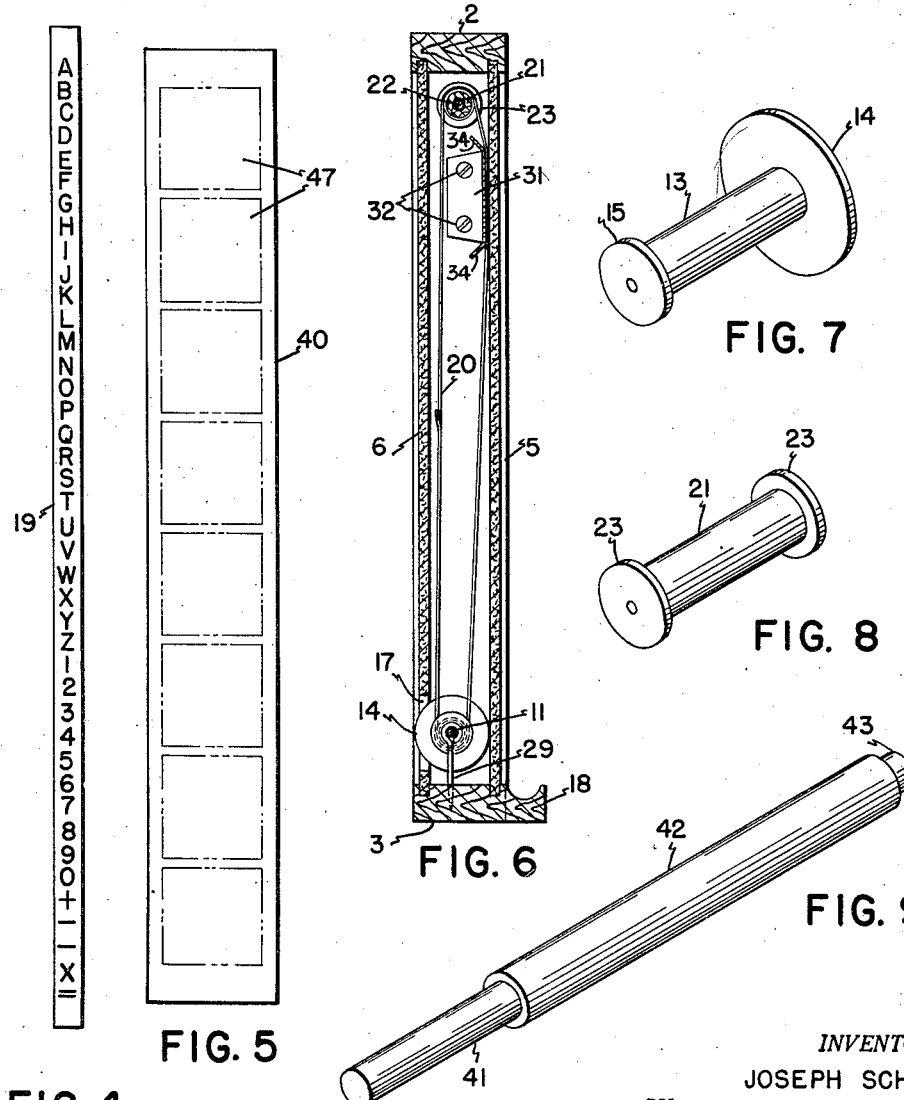
INVENTOR.
JOSEPH SCHATZ
ATTORNEY Patented Jan. 10, 1950

2,494,362

UNITED STATES PATENT OFFICE 2,494,362

EDUCATIONAL BLACKBOARD

Joseph Schatz, Malden, Mass.

Application July 2, 1946, Serial No. 681,003

2 Claims. (Cl. 35—62)

The present invention relates to an educational blackboard to enable the user to associate words and pictures and also to learn spelling and arithmetic.

In the present invention, at one end of the blackboard, preferably at the top, there is provided a series of window openings through which individual letters, numbers, are displayed. Any letter or number may be brought before the window by the manipulation of a disc, separate discs serving for each window. At one side of the group of windows there is positioned a large window through which pictures may be displayed. The teacher or student can manipulate one of two discs to bring a picture before the window and the student may from his position move letters across the window until the desired letters are obtained forming an association with the picture in the window.

The object of the present invention is to obtain the above ends with a simple and inexpensive mechanism and one which will stand rough usage and not easily get out of order.

In the present invention, it will also be seen that the device is constructed of a number of pieces, many of which are of a similar nature, and that it is assembled readily and with very little effort.

Without further describing the merits, and advantages of the present invention, the invention will be more readily described in the specification below when taken in connection with the drawings illustrating an embodiment thereof, in which—

Figure 3 is a sectional view on the line 3—3 of Figure 2.

Figure 4 is a view of a detail of the tape unrolled exhibiting numbers, letters and symbols.

Figure 5 is a view of a detail of the tape unrolled on which the pictures are superimposed.

Figure 6 is a sectional view taken on the line 6—6 of Figure 2 but without the front removed.

Figures 7, 8 and 9 are perspective views of further details of the mechanism.

In the drawings like numerals in different figures refer to the same element.

Figure 1:
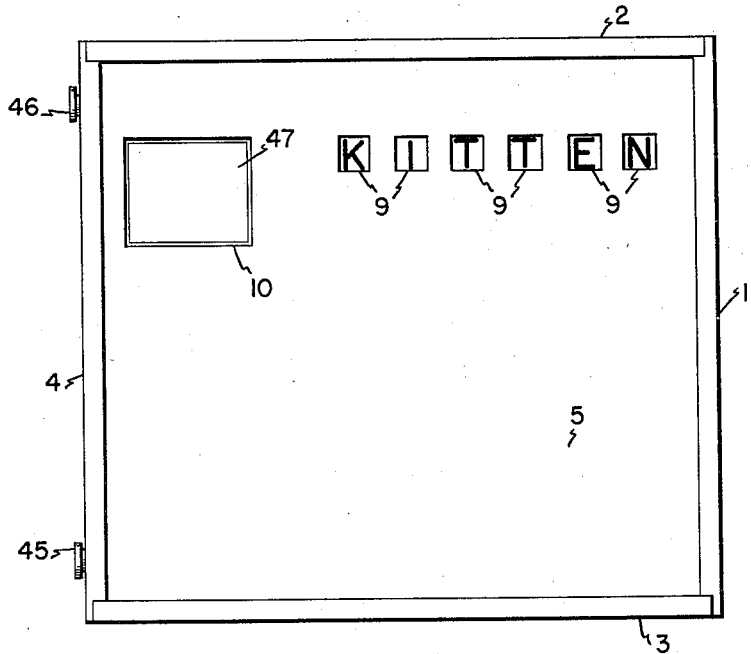
Figure 1 shows a front elevation of the device according to the present invention.
Figure 2:
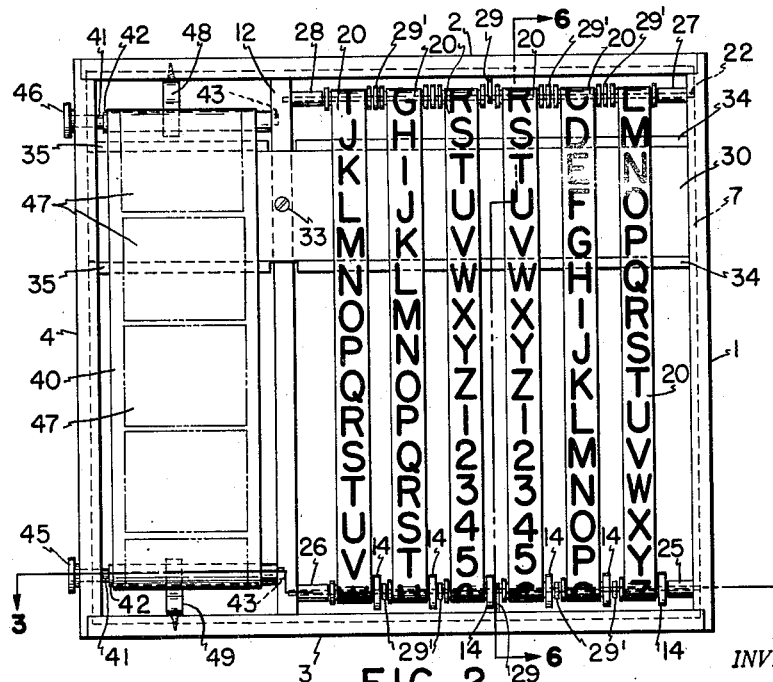
Figure 2 is a front elevation in the same position of Figure 1 with the front board of the blackboard removed.

The blackboard is built in the form of a frame, preferably a rectangular frame, comprising four side members, 1, 2, 3 and 4. These side members are fitted together at the corners preferably by providing shoulders in the two end sides 1 and 4 at their ends and fitting the top and bottom sides 2 and 3 as seen in Figure 1 in these shoulders. All of the side pieces may be similarly grooved to receive the board 5 at the front and the board 6 at the back, the front groove being indicated by the dotted line 7, (Figure 2). It will be noted that the back 6 (Figure 3) sets in grooves 8, 8, in the side pieces 1 and 4. The front board 5 is provided with a number of spaced openings, 9, 9, 9, etc., of which six are indicated in Figure 1. This number may be increased or decreased depending on how many letters or numerals are to be displayed at once. The openings are preferably aligned on a horizontal line and are positioned in the upper part of the board. At one side of the line of openings or windows is a single large window opening 10, through which a figure is displayed. The construction of the mechanism by which the figures, numbers and symbols and letters are displayed through the windows is shown clearly in Figure 2 through Figure 9 of the drawings. A stiff wire 11 is made fast in the side board 1 of the frame on one end and at the other end this wire is made fast in a cross supporting board or bar 12, (see Figures 2 and 3). Freely rotatable about the smooth wire 11 are a set of spools 13, (see Figures 3 and 6) which spools have one large end 14 and a small end 15. The spools may be made of wood and covered with a rubber tube 16 to provide the desired friction for gripping the tape upon which the numbers, symbols and letters are printed or written. The large ends of the spools 13 are mounted so that their periphery projects for a short arc as indicated at 17, Figure 3, through slots or openings in the back board 6. As many spools 13 are used as there are window openings for the letters, numerals and symbols. The spool 13 is the operating spool and these are all positioned and aligned at the forward end of the board normally nearest the user adjacent the chalk and eraser rail 18, (see Figure 6) which may be a part of the bottom board 3.

The tape 19 of letters, numerals and symbols are joined at their ends to form a continuous belt 20, and at the top end of the device, this belt passes around a second roller 21 which is similarly supported by a wire 22 fastened at one side in the board 1, and at the other side in the cross bar or support 12. The roller or spool 21 may be provided with two similar end flanges 23, 23, and may also be covered by a rubber tube or hose if desired. The wire 22 which should also be taut or stiff, carries all of the rollers at the top end of the frame, while the wire 11 carries all of the rollers at the bottom end of the frame. For spacing purposes, spacing rolls such as indicated at 25 and 26, (Figure 3) and 27, 28, (Figure 2) may also be used. In order to strengthen the support of the wires 11 and 22, suitable eyelet members 29 with wood screw ends screwing into the lower and upper boards 2 and 3 respectively, may be used. These, with washers 29' will also act to align the rollers in their proper place and keep them in position so that the belts formed of the tapes will always be accurately aligned before the windows. Washers 29' also serve to keep a spool stationary when the one beside it is turned.

Behind the window openings, there is provided a plate 30, extending across the device. This plate has a backwardly turned flange 31, (Figure 6) through which two screws 32 pass, holding the plate at one end to the side or end board 1. The plate 30 also extends over the face of the partition board 12 to which it is attached by means of the screw 33 and at the left end of the device as seen in Figure 2, it extends into a groove in the board 4.

The plate 30 is also provided with backwardly extending flanges 34 on one side of the partition board 12 and similar backwardly extending flanges 35 on the other side of the partition board 12 where the large window opening 10 is positioned. This plate serves not only to keep the tapes against the windows as a protection so that the person who is using the device cannot easily poke a sharp object through the tapes or sever them.

As has been stated above the tapes comprise letters, numbers and symbols and are formed as an endless belt and these may be moved in either direction by turning the large end 14 of the spools 13, the rubber covering of the spool 13 serving to provide sufficient friction so that the belt is readily moved.

In the case of the picture tape 40, it is preferable to attach each end to a roll. The roll for this purpose is shown in the perspective in Figure 9. It comprises an inner shaft 41 with a covering tube 42 to which one end of the picture tape 40 is attached. The shaft 41 at one end sets in a recess 43 in the partition board 12, while the other end of the shaft 41 passes through the wall 4 which forms a bearing as indicated at 44. This shaft 41 extends beyond the side board 4 to permit the attachment of a knob or handle 45 by which the shaft is turned. Two such shaft assemblies are provided with handles 45 and 46, Figure 1, projecting from the side of the device by means of which the picture tape 40 is turned. The picture tape 40 has mounted on it as indicated by the broken frames 47, various types of pictures which may of course be selected in accordance with the subject matter desired.

The tape is secured at its ends to the rolls so that when it is desired to move the tape in one direction, one roll is turned, and in the other direction the other roll is turned.

Spring members 48 and 49 attached to the lower and upper boards may be used to bear against the rolls and keep the pictures drawn taut over them.

It will be noted in the assembly of the structure that the device may be assembled as viewed in Figures 1 and 2 from the right to the left, the bar or cross support 12 being inserted after the belts carrying the letters, numerals and symbols have been put in place.

When the cross support 12 has been put in place, then the shaft assemblies for the picture tapes attached may be put in position and then the end board 4 finally put in place after which the knobs 45 and 46 may be attached to the shafts 41.

In the operation of the device, the user may simply thumb the wheel 14 of the belts to bring the desired symbol, letter or number before the window. This operating wheel is positioned in such a position that the person can use it and at the same time view the front of the board to see what letter appears.

The educational uses of the device of the present type is quite obvious. The board itself is preferably adaptable for the use of chalk or other marking means, permitting the entire rest of the board to be marked either by copying the word or subject matter appearing in the windows or by copying or drawing the picture appearing in the window.

The device is readily adaptable for school or home use, since it is compact and occupies no greater space than the ordinary blackboard now commonly used.

Having now described my invention, I claim:

1. A rectangular writing board device comprising a flat casing having similar large front and rear walls forming writing boards, said front walls having a plurality of window openings aligned therein parallel to one side of the casing a further window opening in said front wall spaced away from said other window openings, a cross support within said casing extending across the same at right angles to said aligned windows and between the same and the further window opening, a pair of wire shafts suspended between said support and one side of the casing, a plurality of pairs of spools, comprising one with a large flange and one with a small flange, the spools having large flanges having sectors projecting through slots in the rear wall of said casing, said spools being mounted for free rotation on one wire and the others on the other wire, endless belts with characters thereon wound over each pair of spools such that the characters may register before a window a further pair of rollers having one end journalled in said support and the other end passing through the end support of the casing, a belt having characters appearing thereon attached at each end to said last pair of rollers and knobs attached thereto externally of said case for winding and unwinding said belt, said belt registering with the last mentioned window.

2. A rectangular writing board device comprising a flat casing having similar large front and rear walls forming writing boards, said front walls having a plurality of window openings aligned therein parallel to one side of the casing, a further window opening in said front wall spaced away from said other window openings, a cross support within said casing extending across the same at right angles to said aligned windows and between the same and the further window openings, a pair of wire shafts suspended between said support and one side of the casing, a plurality of pairs of spools, comprising one with a large flange and one with a small flange, the spools having large flanges having sectors projecting through slots in the rear wall of said casing, said spools being mounted for free rotation on one wire and the others on the other wire, endless belts with characters thereon wound over each pair of spools such that the characters may register before a window a further pair of rollers having one end journalled in said support and the other end passing through the end support of the casing, a belt having characters appearing thereon attached at each end to said last pair of rollers and knobs attached thereto externally of said case for winding and unwinding said belt, said belt registering with the last mentioned window, and a plate member positioned and extending in back of said windows and holding said belts to said window, said plate being recessed in an end wall of the casing and also attached to said cross support.

JOSEPH SCHATZ.

REFERENCES CITED

The following references are of record in the file of this patent:

UNITED STATES PATENTS

| Number | Name | Date |
|---|---|---|
| 98,773 | Jeffers | Jan. 11, 1870 |
| 296,900 | Wheeler | Apr. 15, 1884 |
| 488,411 | Wyman | Dec. 20, 1892 |
| 536,526 | Hooley | Mar. 26, 1895 |
| 651,275 | Seiler | June 5, 1900 |
| 718,520 | Prosser | Jan. 13, 1903 |
| 770,841 | Barker | Sept. 27, 1904 |
| 1,246,860 | Bracht et al. | Nov. 20, 1917 |
| 2,087,043 | Phillips | July 13, 1937 |

FOREIGN PATENTS

| Number | Country | Date |
|---|---|---|
| 9,831 | Great Britain | Feb. 7, 1891 |
| 4,752 | Great Britain | Mar. 27, 1915 |